(12) United States Patent
Klein Gunnewiek et al.

(10) Patent No.: US 6,385,243 B1
(45) Date of Patent: May 7, 2002

(54) ENCODING AN INFORMATION STREAM ORGANIZED AS A SEQUENCE OF PICTURES

(75) Inventors: Reinier B. M. Klein Gunnewiek; Wilhelmus H. A. Brüls, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/313,600

(22) Filed: May 18, 1999

(30) Foreign Application Priority Data

May 20, 1998 (EP) .............................................. 98201687

(51) Int. Cl.⁷ ................................................. H04N 7/12
(52) U.S. Cl. .............................. 375/240.15; 375/240.02
(58) Field of Search ...................... 375/240.02–240.07, 375/240.12, 240.15; 348/699, 700, 404.1, 409.1, 415.1, 419.1, 421.1; 382/232, 236, 238; H04N 7/12

(56) References Cited

U.S. PATENT DOCUMENTS

| | | | |
|---|---|---|---|
| 5,610,659 A | | 3/1997 | Maturi et al. ................. 348/42 |
| 5,694,171 A | * | 12/1997 | Katto .................... 375/240.03 |
| 5,703,966 A | * | 12/1997 | Astle ........................... 382/236 |
| 5,822,024 A | * | 10/1998 | Setogawa et al. ........ 348/421.1 |
| 6,031,575 A | * | 2/2000 | Suzuki et al. .......... 375/240.14 |

FOREIGN PATENT DOCUMENTS

EP 0732857 A1 9/1996 ............ H04N/7/50

OTHER PUBLICATIONS

"New Generation of Real–Time Software–Based Video Codec: Popular Video Coder II (PVC–II)", By Ho–Chao Huang et al., IEEE Transactions on Consumer Electronics, vol. 42, NO. 4, Nov. 1996, pp. 963–973.

* cited by examiner

Primary Examiner—Nhon T Diep
(74) Attorney, Agent, or Firm—Russell Gross

(57) ABSTRACT

An audio and/or video information stream organized as a sequence of pictures is encoded through an at least partly software-based procedure. The sequence includes Intrapictures, Predictive pictures, and Bidirectional predictive pictures. In particular, for a substantial and predictively located selection (77) among said Bidirectional predictive pictures only one prediction direction is used (76). For any remaining Bidirectional predictive picture both prediction directions are maintained.

10 Claims, 2 Drawing Sheets

ENCODING AN INFORMATION STREAM ORGANIZED AS A SEQUENCE OF PICTURES

FIELD OF THE INVENTION

The invention relates to a method and device for encoding an information stream that is organized as a sequence of pictures.

BACKGROUND OF THE INVENTION

The processing of digital audio and video, such as for transmission or for storage, has necessitated the use of various data compression technologies. A non-limiting example is the MPEG standard, that has various versions for audio as well as for video.

Another standard is H.261. Realizing such compression in software has been disclosed in Ho-Chao Huang et al, New Generation of Real-Time Software-Based Video Codec: Popular Video Coder II, IEEE TR. Cons.El. Vol.42, No.4, P.963–973. It is feasible to have compression and similar operations executed in a mixed software and hardware environment. The number of operations required for encoding through software is difficult to predict. An embodiment hereinafter will be mainly described with reference to video. Now generally, the compression is executed on the basis of Groups of Pictures (GOPs). Hereinafter, the term "picture" will be used consistently. Depending on the actual video standard, the term "picture" may mean "frame" as well as "field". Now, the compression of frame-wise organized audio or mixed audio/video information streams may be effected in similar manner. Such processing must be done in real-time, which implies that a high penalty must be paid in case of processor overload, by loosing pictures or parts thereof.

Such compression has been proposed on the basis of so-called Intra-pictures, Predictive-pictures and Bidirectional predictive pictures.

SUMMARY OF THE INVENTION

The inventors have recognized the non-uniform processing efforts that are necessary for these three pictures categories. They have also recognized various tradeoffs that could be made among these categories for improving processing throughput whilst maintaining encoding quality.

In consequence, among other things, it is an object of the present invention to systematically suppress certain elements of the conventional processing to alleviate processing load. Now therefore, according to one of its aspects, the invention is characterized as recited in the characterizing part of claim 1. The invention also relates to an encoder arranged for implementing a method according to the invention. Further advantageous aspects are recited in dependent Claims.

These and further aspects and advantages of the invention will be discussed more in detail hereinafter with reference to the disclosure of preferred embodiments.

DETAILED DESCRIPTION OF PREFERRED EMBODIMENTS

Figure 1:
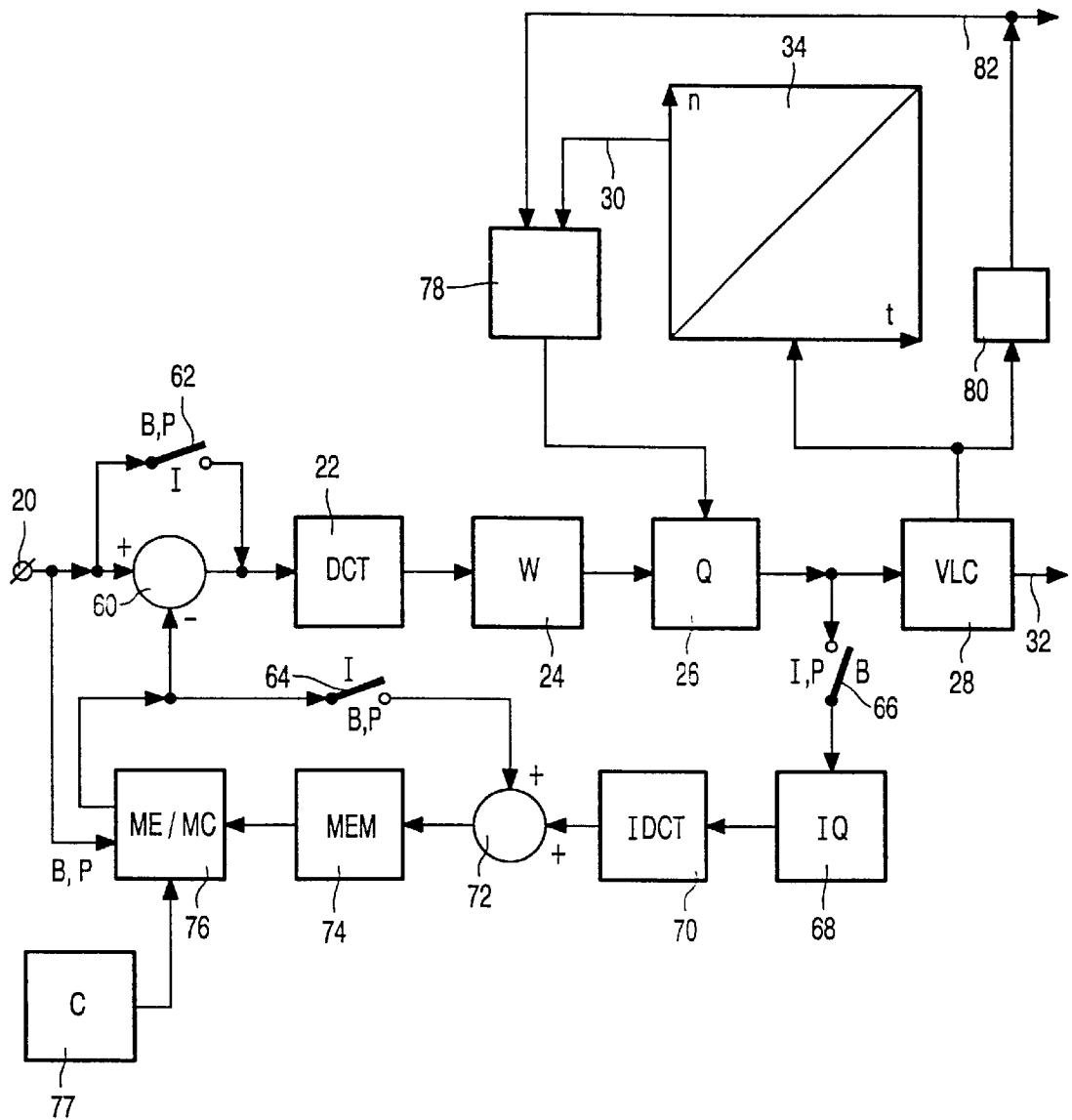
FIG. 1 shows a block diagram of an inventive apparatus.

FIG. 1 is a block diagram of an apparatus according to the invention, in particular for use with video. First, a simplified version is discussed, wherein elements 62, 64, 66, 68, 70, 72, 74, 76, 77, 78, 80, have been left out. The video received on input 20 is organized in pictures that have uniform numbers of pixels. In DCT element 22, each picture is divided into a sequence of video blocks that are each composed from an array of 8×8 pixels. An intermediate division of the image is into slices, that consist of two adjacent horizontal rows of blocks. Each block is subjected to a Discrete Cosine Transform that produces an array of 8×8 digital frequency coefficients.

In a two-dimensional DCT result block, each coefficient relates to a wave frequency. The upper-left coefficient "00" relates to an average value associated to zero spatial frequency in both co-ordinate directions. To the right thereof, the waviness is horizontal. Below the first position the waviness is vertical. In slanted directions, the waviness is oriented in corresponding fashion with respect to the co-ordinate directions. Subsequent decoding by an inverse Discrete Cosine Transform will give a lossless reconstruction of the original image.

In FIG. 1, weighting element 24 introduces weighting factors for the respective coefficients, taking into account the relatively lower sensitivity of human perception for smaller details or higher spatial frequencies. The object of the weighting is data reduction. The weighting factor for coefficient "00" is 1, and the others decrease in all directions away from this coefficient. The loss of information so incurred is generally invisible to a user, even under favorable conditions.

For further data reduction, in quantifier 26 the various coefficients, apart from coefficient 00, are divided by a redundancy factor Q that is uniform for the video block in question. This factor may be uniform for a series of video blocks such as a slice, or for a whole video picture. The various quotients are subsequently clipped with respect to a uniform threshold value: coefficients values below the threshold will be dropped. The processor load for encoding that uses such software applies to elements 26, 28 in FIG. 1, and may be mapped on a single high-performance microprocessor such as an INTEL Pentium. Q-value and processor load are about inversely proportional to each other.

Finally, in coder 28 the resulting coefficients are serialized and subjected to Variable Length Encoding according to a Huffinann or similar type of code. The resulting bitstream is outputted on output 32. In computing element 34 the actual processing load is calculated, and retrocoupled along line 30 to quantifier 26. The latter may adjust the value of Q to retain the processing load per block or per picture in an allowable range.

In the above, the number of clock cycles depends on the image content. Differences may occur between various pictures, as well as between slices or between blocks within a single picture. A requirement to cope with worst case conditions will therefore cause overdimensioning of the hardware facilities.

Figure 2A:
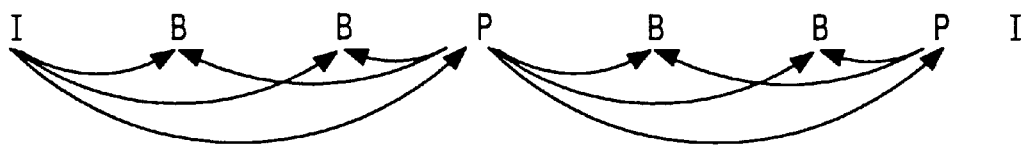
FIGS. 2A–C show various exemplary MPEG organizations.
Figure 2B:
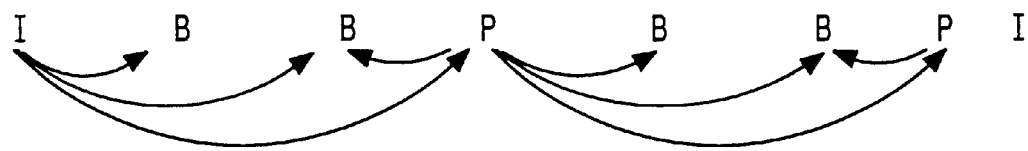
Figure 2C:
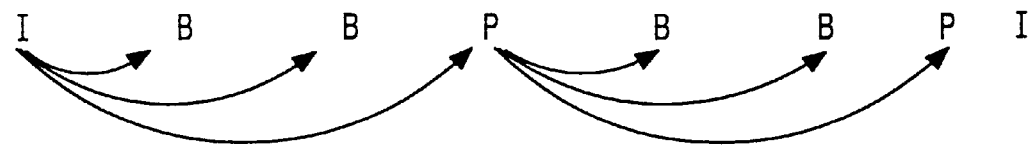

The invention may, by way of example, be used in an MPEG environment. Now, FIGS. 2A–2C show various exemplary MPEG organizations as expressed in a sequence of pictures. MPEG has three categories: I-, B-, and P-pictures. Intrapictures contain all information to reproduce the image in question. Predictive pictures contain less than all necessary information, but need another, already processed picture to be reproduced in such manner that itself may act as predecessor for a picture processed still later. Finally, Bidirectionally predicted pictures contain less than all necessary information, but need one or more already processed pictures to reproduce the image in question; however, such will not result in a picture that itself may act again as predecessor for an image to be processed yet. By itself, the usage of and the mathematics necessary for this procedure is considered common general knowledge in the art of video encoding. P-pictures may therefore be chained, but B-pictures will always be terminal pictures. Coherence has been indicated by arrows. Prediction is effected before compression.

Now, the inventors have recognized that B-pictures are a suitable target for reducing processing load for the following reasons. First, bidirectional prediction needs 'forward' as well as 'backward' vectors, which doubles the effort required for obtaining these vectors. Furthermore, the two sets of vectors must be processed to produce a single coherent picture for compression, which raises the effort still further. Next, backward prediction generally requires at least two image memories, because the reference picture following the picture to be compressed must be available, encoded and decoded again, before the reference vectors for the picture to be predicted may ever be computed.

These disadvantages are absent for a B-picture that is predicted exclusively from a preceding picture. These "single-side" B-pictures may constitute an appreciable fraction of all B-pictures, such as every other one, two-out-of-three, or even all B pictures. In the latter case, the greatest saving in memory occurs. Preferably, they should have a uniform distribution for every group of pictures, so that the system would know what measures should be taken. However, non-uniform patterns are feasible per se. At the latest when starting with a particular group of pictures, the system should know what to do, for example, through a code in the header of the leading I-picture. Now, certain aspects of such B-picture resemble a P-picture. However, the following aspects of the "simplified" B-pictures differentiate them from P-pictures:

Coding efficiency may be improved by encoding a B-picture with a somewhat higher value, such as 40%, of the factor Q. Additional coding noise will hardly ever be visible, because such coding noise will not be added to subsequent pictures, such as could indeed be the case for I- and P-pictures that behave as references. Such coding noise would in effect necessitate to represent subsequent pictures at a higher bit length, because of the lower quality in the reference picture.

The processing load may indeed be lowered through raising the Q-value. The load depends on the image complexity, and also on the redundancy factor Q: a higher redundancy factor will decrease processor load.

After encoding, "single-side" B-pictures need not be decoded again, because they will not be used as reference picture for any preceding or succeeding picture. By itself, this gives an appreciable load reduction vis a vis P-pictures. 'Realtime' hardware encoders allow little or no resource sharing: the local decoder on the encoding side has been provided on-chip anyway and no savings would be effected through sharing. However, the usage of wholly or partly software encoding allows to use resources for various different purposes. Instead of for local decoding, the facilities may be used for other purposes.

The B-picture may be encoded before any later reference picture will have been received, allowing to use fewer picture buffers. Furthermore, the encoding of a single B-picture will need to store only a single decoded picture.

With recursive motion estimation, the vectors that are acquired for a P-picture may form good candidates by scaling these vectors. Another possibility is to use the vectors acquired for a particular B-picture as candidates for a next-following P-picture.

Now, FIG. 1 has been extended for an MPEG scheme by a retrocoupling loop. First, switch 66 will be closed for I- and P-pictures. It will be open for B-pictures. The loop comprises an inverse quantifier 68 that is the opposite of quantifier 26. Element 70 executes an Inverse Discrete Cosine Transform as opposite to DCT element 22. The result is fed to adder 72 and subsequently stored in memory 74. Motion estimator 76 performs motion estimation as well as motion compensation. Motion estimator 76 is coupled to input 20 and to control unit 77. For P-pictures, motion is estimated relative to one preceding picture. For B-pictures, motion is estimated relative to a preceding as well as a following picture. In case of "single-side" B-pictures, only one prediction direction is used. In that case, control unit 77 performs a substantial and predictively located selection of the B-pictures. According to a control signal from control unit 77 to motion estimator 76, motion is estimated for said selection by using only one prediction direction. In a preferred embodiment, the prediction direction should go in the same direction as temporal progression. In case one prediction direction is used, no motion estimation is necessary for the other prediction direction, what leads to the already mentioned advantages. In a further embodiment, said selection of B-pictures depends on the processing load. In that case, computing element 34 should be coupled to control unit 77. For any remaining B-picture both prediction directions are maintained. In a practical embodiment, all B-pictures have single-sided prediction. In that case, the most simple and cost-effective arrangement can be obtained. The resulting picture content from motion estimator 76 is sent to subtracter 60 that is only operative for B- and P-pictures. Switch 62 is closed for I-pictures, to effectively short-circuit subtracter 60. For B- and P-pictures, the motion-compensated picture is also sent by switch 64 to adder 72 for adding to received pictures from IDCT 70.

Variable length coder 28 outputs a coded information stream on output 32 for storage or transmission. It furthermore outputs progress information to computing element 34 and can also send information as pertaining to output bitrate 32 to bitrate control block 80. The latter will check whether the bitrate as averaged over an applicable time interval will not exceed processing and/or buffering capacities of elements that are downstream from output 32. The result is a control signal that may be outputted alongside with output 32 in a downstream direction, as well as be retrocoupled together with the control signal from computing element 34 to a logic combination element 78. If the bit-rate load is not excessive, computing element 34 is determining. If the bitrate is too high, element 78 will overrule the control through computing element 34.

FIG. 2A shows an exemplary group of pictures that has one I-picture, two P-pictures, and four B-pictures, all B-pictures having bidirectional prediction. The number of pictures in a GOP is in principle arbitrary. In FIG. 2B, a substantial fraction of the B-pictures has only single-sided prediction, such as through the selective opening of switch 66 in FIG. 1. Other substantial fractions would be ⅓ or ⅔. Small fractions would produce only little improvement. Larger fractions have the disadvantage that P- pictures may not lie too far from each other, because the prediction will become more difficult. In FIG. 2C, all B-pictures have only single-sided prediction.

It should be noted that the above-mentioned embodiments illustrate rather than limit the invention, and that those skilled in the art will be able to design many alternative embodiment without departing from the scope of the appended claims. In the claims, any reference signs placed between parentheses shall not be construed as limiting the claim. The word "comprising" does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware.

What is claimed is:

1. A method of encoding an information stream that is organized as a sequence of pictures,
    characterized in that the method comprises the steps of:
        compressing said information stream to obtain an output stream including Intrapictures, Predictive pictures, and Bidirectional predictive pictures, and
        using only one prediction direction (76) for an appreciable fraction of the Bidirectional predictive pictures whilst maintaining both prediction directions for any remaining Bidirectional predictive picture.

2. A method as claimed in claim 1, further comprising the step of uniformly maintaining one of the two prediction directions (76, 77), that goes in the same direction as temporal progression.

3. A method as claimed in claim 1, wherein said appreciable fraction amounts to approximately one half of all Bidirectional predictive pictures of said information stream.

4. A method as claimed in claim 1, wherein said appreciable fraction amounts to all Bidirectional predictive pictures.

5. A method as claimed in claim 1, wherein said appreciable fraction depends on the processing load (34) of the encoding.

6. A method as claimed in claim 1, further comprising the step of raising for all bidirectional predictive pictures a redundancy factor Q (26) with respect to other picture types.

7. A device for encoding an information stream that is organized as a sequence of pictures,
    characterized in that the device comprises:
        means for processing said information stream to obtain an output stream including Intrapictures, Predictive pictures, and Bidirectional predictive pictures, and
        a motion estimation mechanism (76) for using only one prediction direction for an appreciable fraction of the Bidirectional predictive pictures of said selection, whilst maintaining both prediction directions for any remaining Bidirectional predictive picture.

8. A device as claimed in claim 7, wherein uniformly the prediction direction (76, 77), that goes in the same direction as temporal progression is maintained.

9. A device as claimed in claim 7, wherein said appreciable fraction amounts to approximately one half of all Bidirectional predictive pictures of said information stream.

10. A device as claimed in claim 7, wherein said appreciable fraction amounts to all Bidirectional predictive pictures.

* * * * *